Aug. 12, 1969   W. F. BUCHELE ETAL   3,460,332
STRAWBERRY PICKER
Filed July 15, 1966   3 Sheets-Sheet 1
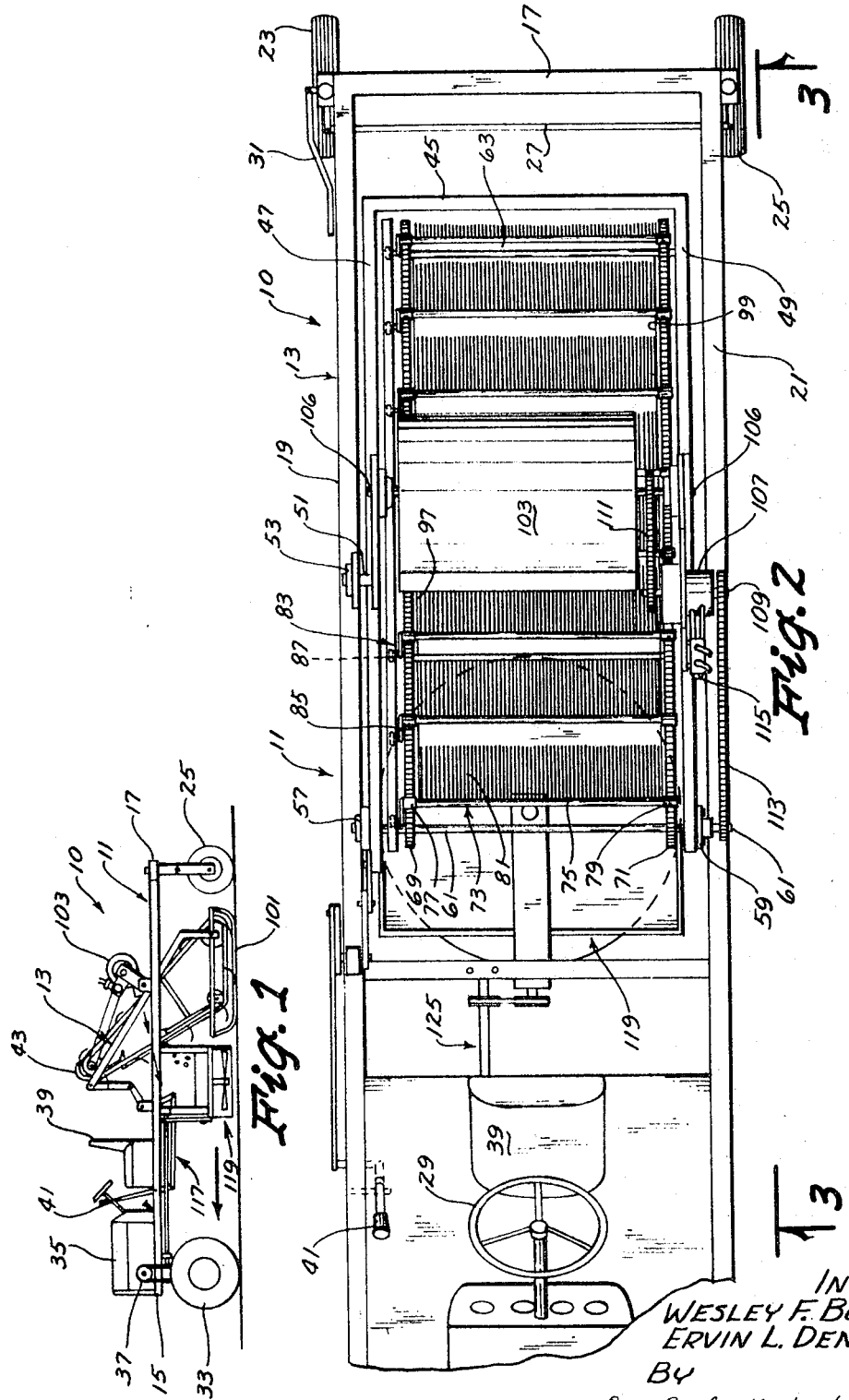
INVENTORS
WESLEY F. BUCHELE
ERVIN L. DENISEN
BY
Duck, Zarley, McKee & Thomte
ATTORNEYS

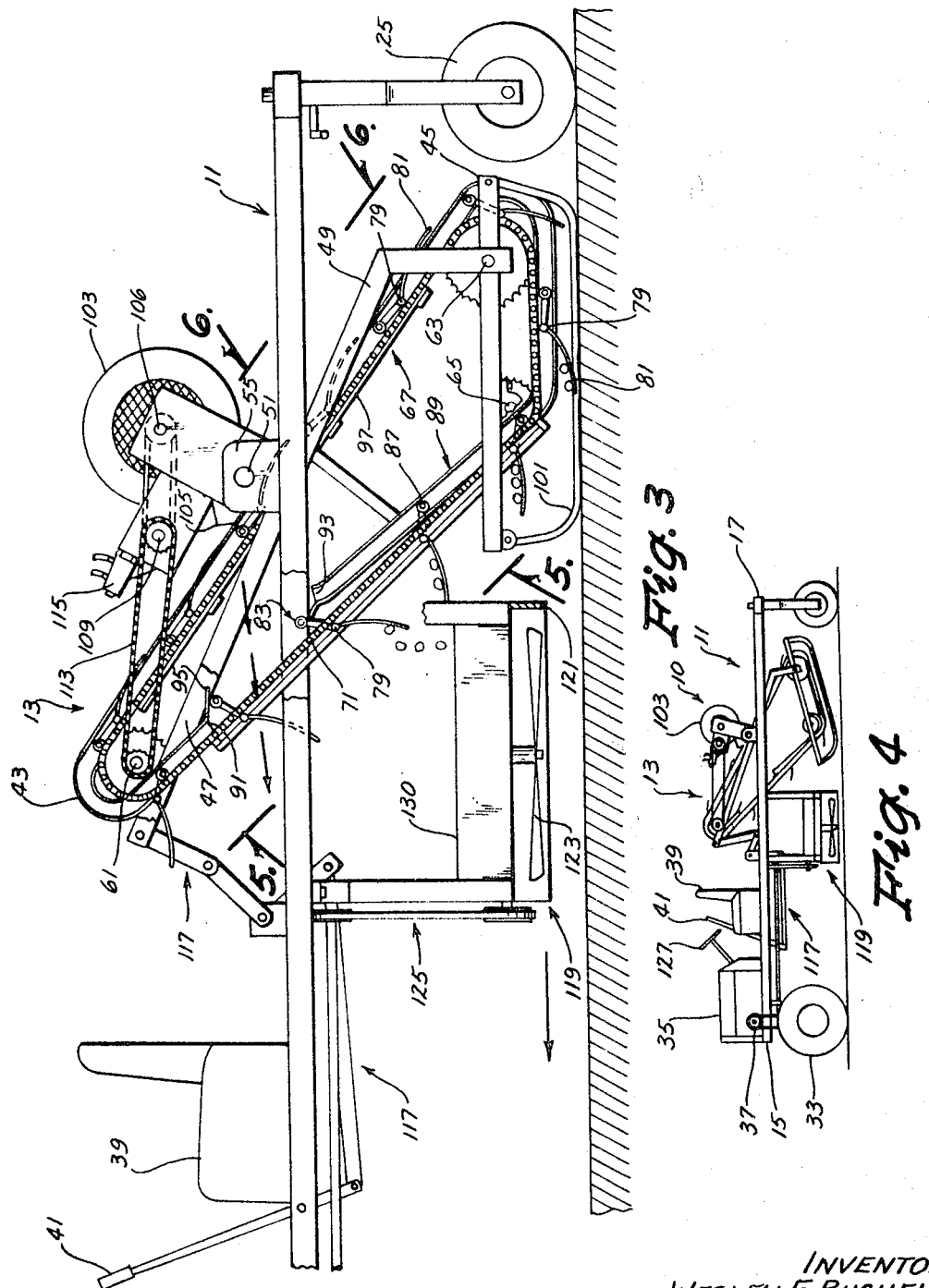

Aug. 12, 1969  W. F. BUCHELE ETAL  3,460,332
STRAWBERRY PICKER
Filed July 15, 1966  3 Sheets-Sheet 3
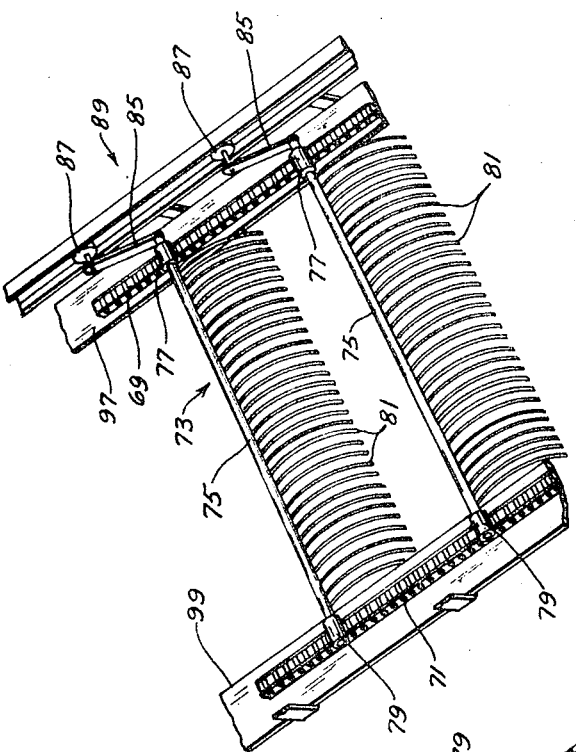
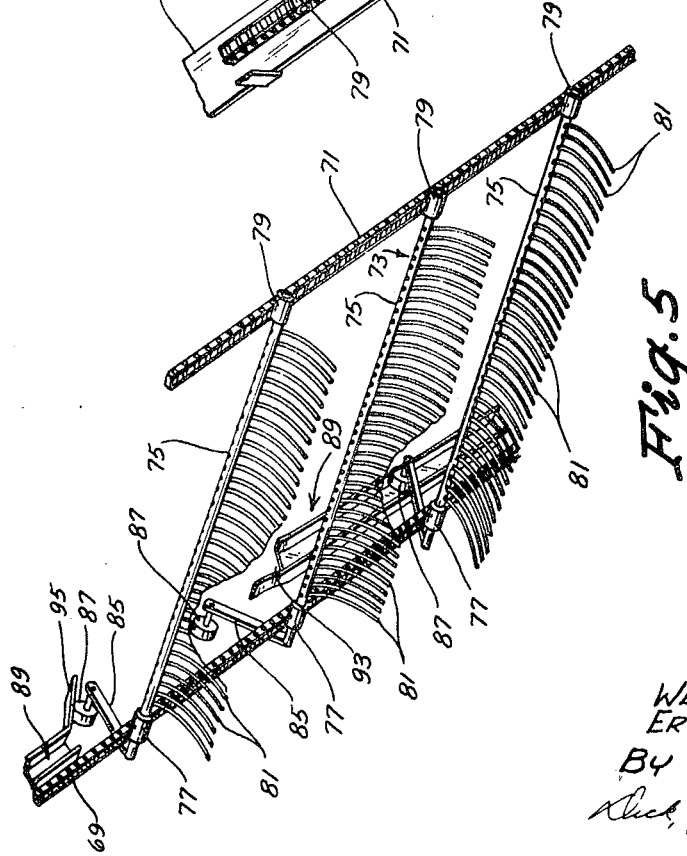
INVENTORS
WESLEY F. BUCHELE
ERVIN L. DENISEN
BY
ATTORNEYS United States Patent Office 3,460,332
Patented Aug. 12, 1969

3,460,332
STRAWBERRY PICKER
Wesley F. Buchele and Ervin L. Denisen, Ames, Iowa, assignors to Iowa State University Research Foundation, Ames, Iowa, a corporation of Iowa
Filed July 15, 1966, Ser. No. 565,514
Int. Cl. A01g 19/00; A01d 35/26
U.S. Cl. 56—330
9 Claims

ABSTRACT OF THE DISCLOSURE

A berry picker comprising a wheel-supported frame having a continuous chain mechanism movably mounted thereon. A plurality of grappling elements are pivotally secured in a spaced apart condition on the chain mechanism and extend laterally across the frame. The grappling elements include a plurality of spaced apart fingers. A tripping means is provided on said frame which operatively engages the grappling elements to change the attitude of the fingers of the grappling elements so that berries picked by the fingers from under the frame can be dumped from the grappling elements when the attitude of the fingers is changed from a substantially horizontal position to a substantially vertical position.

---

Strawberries have been harvested by hand for many years. This type of harvesting is very slow and makes the raising of strawberries less than a profitable crop. A mechanical strawberry picker has never been devised, but a few devices have been manufactured to mechanically harvest the other berries. However, these devices have met with little success for several reasons, among them being: (1) The devices damage the plant; (2) the devices damage the berries; (3) The devices do not pick a satisfactory number of the berries from the plants; and (4) The devices are difficult to operate and expensive to maintain.

Therefore, it is a principal object of this invention to provide a strawberry picker which efficiently and economically picks strawberries with a minimum of damage to the plant and the strawberries.

A further object of this invention is to provide a strawberry picker which is easily operated.

A further object of this invention is to provide a strawberry picker which is self-propelled.

A further object of this invention is to provide a strawberry picker having means thereon to cut the tops of the strawberry plants prior to the picking of the strawberries therefrom.

A further object of this invention is to provide a strawberry picker which has a ground sensing means thereon to limit the movement of an endless chain mechanism.

A further object of this invention is to provide a strawberry picker having a fan means thereon adapted to blow trash from the grappling elements.

A further object of this invention is to provide a strawberry picker which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the device;

FIG. 2 is an enlarged fragmentary top view of the device;

FIG. 3 is an enlarged fragmentary side view of the device;

FIG. 4 is a side view of the device illustrating the chain mechanism assembly in one position of its pivotal movement;

FIG. 5 is a fragmentary perspective view of the endless chain assembly as would be seen on line 5—5 of FIG. 3; and FIG. 6 is a fragmentary perspective view of a portion of the endless chain mechanism as would be seen on line 6—6 of FIG. 3.

The strawberry picker is generally indicated by the reference numeral 10 and includes a wheel supported frame means 11 and a chain assembly 13 pivotally mounted thereon. Frame means 11 is comprised of a substantially rectangular frame having a forward end 15, rearward end 17, and opposite sides 19 and 21. Frame means 11 is provided with a pair of wheel assemblies 23 and 25 which are pivotally mounted at the rearward end thereof as best seen in FIGS. 2 and 3. Wheel assemblies 23 and 25 are interconnected by means of a tierod 27 and are operatively connected to a steering wheel 29 by means of a steering linkage 31.

A drive wheel means 33 is operatively mounted at the forward end of frame means 11 and is driven by an engine 35 in conventional fashion by a chain 37. As best seen in FIG. 1, frame means 11 is supported above the ground in a spaced relationship thereto by means of the various wheel assemblies. As also seen in FIG. 1, frame means 11 is provided with an operator's seat 39 and a movable control lever 41 positioned adjacent thereto.

Chain assembly 13 includes an upper end 43, lower end 45, and opposite sides 47 and 49. Sides 47 and 49 are pivotally connected to sides 19 and 21 of frame means 11 respectively by means of a shaft 51. Shaft 51 extends through plates 53 and 55 which extend upwardly from sides 19 and 21 respectively. Shaft 51 also extends through suitable openings in sides 47 and 49.

A pair of bearings 57 and 59 are operatively mounted at the upper end of chain assembly 13 and rotatably receive a shaft 61 extending therebetween. A shaft 63 is rotatably mounted in and extends between the lower ends of sides 47 and 49 as best seen in FIG. 2. A shaft 65 is rotatably mounted in and extends between the opposite sides 47 and 49 of chain assembly 13 at a point forwardly of shaft 63 as best seen in FIG. 3. Each of shafts 61, 63 and 65 are provided with a pair of spaced apart sprockets rigidly secured thereto for rotation therewith respectively. A chain means 67 is operatively mounted on the sprockets on the shafts 61, 63 and 65 and is comprised of endless chain members 69 and 71. A plurality of grappling elements 73 are pivotally secured to chain members 69 and 71 in a spaced condition and extend therebetween as best seen in FIGS. 2 and 3. Each of grappling elements 73 is comprised of a shaft 75, the opposite ends of which are pivotally received by collars 77 and 79 which are operatively secured to chain members 69 and 71. A plurality of elongated, arcuate fingers 81 are secured to shaft 75 between chain members 69 and 71 as best seen in FIG. 2. Each of fingers 81 are curved along their length (FIG. 3) and are circular in cross-section. A cam means 83 is rigidly secured to one end of each of the shaft 75 and is comprised of an arm member 85 secured at one of its ends to shaft 75 and having a roller member 87 rotatably secured to its other end. Each of the roller members 87 are adapted to be received by a channel-shaped guide means 89 positioned adjacent side 47 of chain assembly 13. It can be seen in FIG. 3 that the configuration of guide means 89 is substantially identical to the configuration of the chain assembly. It is also seen in FIG. 3 that guide means 89 is not continuous but has opposite ends 91 and 93 positioned in a spaced apart relationship. End 91 is provided with a guide 95 which extends substantially horizontally rearwardly therefrom and is adapted to recock the grappling element 73. End 93 is formed as seen in FIG. 3 and permits roller elements 87 to become disengaged from guide means 89 to permit the shaft 75 and fingers 81 to pivot so that the fingers 81 assume a substantially vertical position to cause the strawberries to fall therefrom.

As best seen in FIG. 6, chain mechanism 13 is provided with a pair of spaced apart chain supports 97 and 99 which are adapted to support chain members 69 and 71 respectively as the chain passes over the upper portion of the chain assembly 13.

The ground sensing means 101 is operatively secured to the lower end of chain assembly 13 and is adapted to engage the ground to limit the downward movement of chain assembly 13 to prevent the finger members 81 from penetrating the ground as best seen in FIG. 3. A fan means 103 is operatively secured to frame means 11 as illustrated in FIGS. 2 and 3 and is provided with a discharge opening 105. Fan means 103 is of conventional construction and is provided with a shaft 106 extending therethrough upon which the fan blades (not shown) are mounted. Fan means 103 is positioned on frame means 11 so that discharge opening 105 is directed at the chain assembly as indicated by the arrows in FIGS. 1 and 3. A hydraulic motor 107 is operatively mounted on chain assembly 13 as seen in FIGS. 2 and 3 and is provided with a power shaft 109 extending therefrom. A chain 111 extends between conventional sprockets mounted on shafts 106 and 109 to cause the activation of fan means 103. A chain means 113 extends around sprockets on shafts 109 and 61 to cause the operation of the chain elements 69 and 71 and the structure associated therewith. A diverter valve 115 is operatively connected to the hydraulic motor 107 to permit the selective control and speed regulation thereof. Diverter valve 115 is operatively connected to a source of hydraulic fluid under pressure (not shown).

The upper end of chain assembly 13 is pivotally connected to a linkage 117 which is operatively connected to control lever 41. The movement of control lever 41 causes chain assembly 13 to be pivoted with respect to frame 11 about shaft 51 to permit the chain assembly 13 to be moved from the position of FIG. 1 to the position of FIG. 4.

A mower means 119 of the rotary type is operatively supported by frame means 11 as best seen in FIG. 3. Mower means 119 includes a housing 121 which extends around the cutting assembly 123 as also best seen in FIG. 3. Housing 121 is provided with a discharge opening adjacent one side thereof to cause the material being discharged therefrom to be discharged laterally away from the strawberry picking portion of the device. Mower means 119 is driven by the engine 35 by means of drive means 125 extending therebetween.

The normal method of operation is as follows. The strawberry picker 10 is driven through the strawberry field by the engine 35 which is controlled in conventional fashion and the device is steered by means of steering wheel 127. The mower means 119 mows the top portion of the strawberry plants being picked which facilitates the removal of the strawberries from the plants. The material cut from the strawberry plants is discharged laterally from the housing 121 as previously described. The endless chain mechanism is operated by means of hydraulic motor 107 as also previously described and causes the endless chain mechanism to rotate in a clock-wise manner when viewed as in FIG. 3. Control lever 41 causes the chain mechanism 13 to be selectively pivoted about shaft 51 to control the height of the lower end of the chain mechanism with respect to the ground. Ground sensing means 101 slides along the ground and thereby prevents the fingers 81 from digging into the ground as shown in FIG. 3. When it is desired to pivot the chain assembly 13, it is simply necessary to move control lever 41 to the position of FIG. 4 so that the chain mechanism 13 pivots thereby causing the lower end thereof to be raised from the ground.

As previously stated, hydraulic motor 107 causes the rotation of the endless chain assembly. For purposes of description, the operation and attitude of the grappling element 73 will be described from the time that the roller element 87 engages guide 95 on guide means 89. As seen in FIG. 3, fingers 81 on the grappling element 73 are substantially vertical during the period of the disengagement of the roller element 87 with guide means 89. The engagement of roller element 87 with guide 95 causes the grappling element 73 to be pivoted with respect to the chain members 69 and 71 as clearly illustrated in FIG. 3. Guide 95 in effect re-cocks the grappling element 73 and thereby causes the grappling element to assume the attitude shown in FIG. 3 during the time that the grappling element 73 moves on the chain mechanism. Guide means 89 causes the fingers 81 to pass through the strawberry plants thereby removing the berries from the plants as also seen in FIG. 3. As the fingers 81 pass upwardly through the strawberry plants, the fingers 81 assume a substantially horizontal position. As soon as the roller element 87 on the grappling element 73 becomes disengaged from guide means 89, the grappling element 73 pivots thereby causing the fingers 81 to assume a substantially vertical position thereby causing the berries to be dumped therefrom into a suitable receptacle 130. Fan means 103 causes the trash to be blown from the fingers 81 after the strawberries have been dumped therefrom due to the air being passed therethrough as previously described. The fingers 81 remain in a substantially vertical position until the roller element 87 associated therewith again engages guide 95 to re-cock the grappling element 73. The configuration of each of the individual fingers is such that the berries will be removed from the plants with a minimum amount of damage to the plants and berries as well as effectively removing the berries therefrom with a minimum of waste.

The strawberry picker described herein effectively and economically removes the strawberries from the strawberry plants. The apparatus described herein is extremely durable and easy to operate as well as being extremely compact. Thus it can be seen that the device accomplishes at least all of its stated objectives.

Some changes may be made in the construction and arrangement of our strawberry picker without departing from the real spirit and purpose of our invention, and it is our intention to cover by our claims, any modified forms of structure or use of mechanical equivalent which may be reasonably included within their scope.

We claim:
1. In a berry picking device,
   a wheel-supported frame,
   a continuous chain mechanism movably secured to said frame,
   a plurality of grappling elements comprised of a plurality of fingers, said grappling elements being pivotally secured in spaced apart condition on said chain mechanism and extending laterally across said frame,
   and tripping means on said frame operatively engaging said grappling elements to change the attitude of the fingers of said grappling elements whereby berries picked by said fingers from under said frame can be dumped from said grappling elements when the attitude of said fingers is changed from a substantially horizontal position to a substantially vertical position,
   said grappling elements including an elongated shaft, said fingers being secured to said shaft, and means pivotally securing said shaft to said chain mechanism,
   and cam means having a free end secured to one end of said shaft, guide means on said frame substantially defining the path of travel of said chain mechanism, the free end of said cam means being movably secured to said guide means, said frame being disposed in an inclined position so that said chain mechanism can move said grapple elements from a lower position adjacent a ground surface to an elevated position, said guide means engaging said cam means to hold the fingers of said grapple elements in a substantially horizontal position as said grapple elements move over and thence upwardly from said ground surface, said guide means having an open space in its length to release said link to permit said fingers of said grapple element to drop to a substantially vertical position after being elevated from a position adjacent such ground surface.

2. The device of claim 5 wherein said grappling elements include an elongated shaft and said fingers being secured to said shaft, and means pivotally securing said shaft to said chain mechanism.

3. The device of claim 1 wherein a guide element is placed adjacent one end of the opening in said guide means to cause the free end of said link to re-enter the guide means after the fingers on said grapple element are dropped to a vertical position.

4. The device of claim 1 wherein said guide means includes a horizontal portion adapted to guide said grapple elements in a horizontal direction over a horizontal ground surface.

5. In a berry picking device,
a wheel-supported frame,
a continuous chain mechanism movably secured to said frame,
a plurality of grappling elements comprised of a plurality of fingers, said grappling elements being pivotally secured in spaced apart condition on said chain mechanism and extending laterally across said frame.
tripping means on said frame operatively engaging said grappling elements to change the attitude of the fingers of said grappling elements whereby berries picked by said fingers from under said frame can be dumped from said grappling elements when the attitude of said fingers is changed from a substantially horizontal position to a substantially vertical position,
said chain mechanism operatively, movably engaging a guide means on said frame which substantially defines the travel of said chain mechanism,
said guide means including a horizontal portion at its lower end adapted to guide said grappling elements in a horizontal attitude over a horizontal ground surface,
said tripping means operatively engaging said grappling elements to cause the fingers of said grappling elements to move to said substantially vertical position after said grappling elements have been moved upwardly and forwardly from the lower horizontal portion of said guide means.

6. The device of claim 5 wherein a mower means is operatively mounted on said frame and is adapted to cut a portion of the berry plants prior to said fingers passing through the plants.

7. The device of claim 6 wherein said mower means is positioned on said frame so that only the top portions of the plants are cut.

8. The device of claim 5 wherein a fan means is operatively mounted on said frame adjacent said grappling elements, said fan means being positioned so as to cause the removal of material from said fingers after said fingers have been moved to a substantially vertical position by said tripping means.

9. The device of claim 5 wherein each of said fingers are circular in cross-section and are curved along their length.

References Cited

UNITED STATES PATENTS

| | | | |
|---|---|---|---|
| 924,552 | 6/1909 | Holmes | 56—330 |
| 2,732,675 | 1/1956 | Smith et al. | 56—6 |
| 2,780,904 | 2/1957 | Bowie et al. | 56—328 |
| 2,780,905 | 2/1957 | Darlington | 56—330 |
| 2,783,605 | 3/1957 | Heleen | 56—330 |
| 2,789,408 | 4/1957 | Bloxham | 56—328 |

RUSSELL R. KINSEY, Primary Examiner

U.S. Cl. X.R.

56—35, 130